United States Patent Office 3,250,572
Patented May 10, 1966

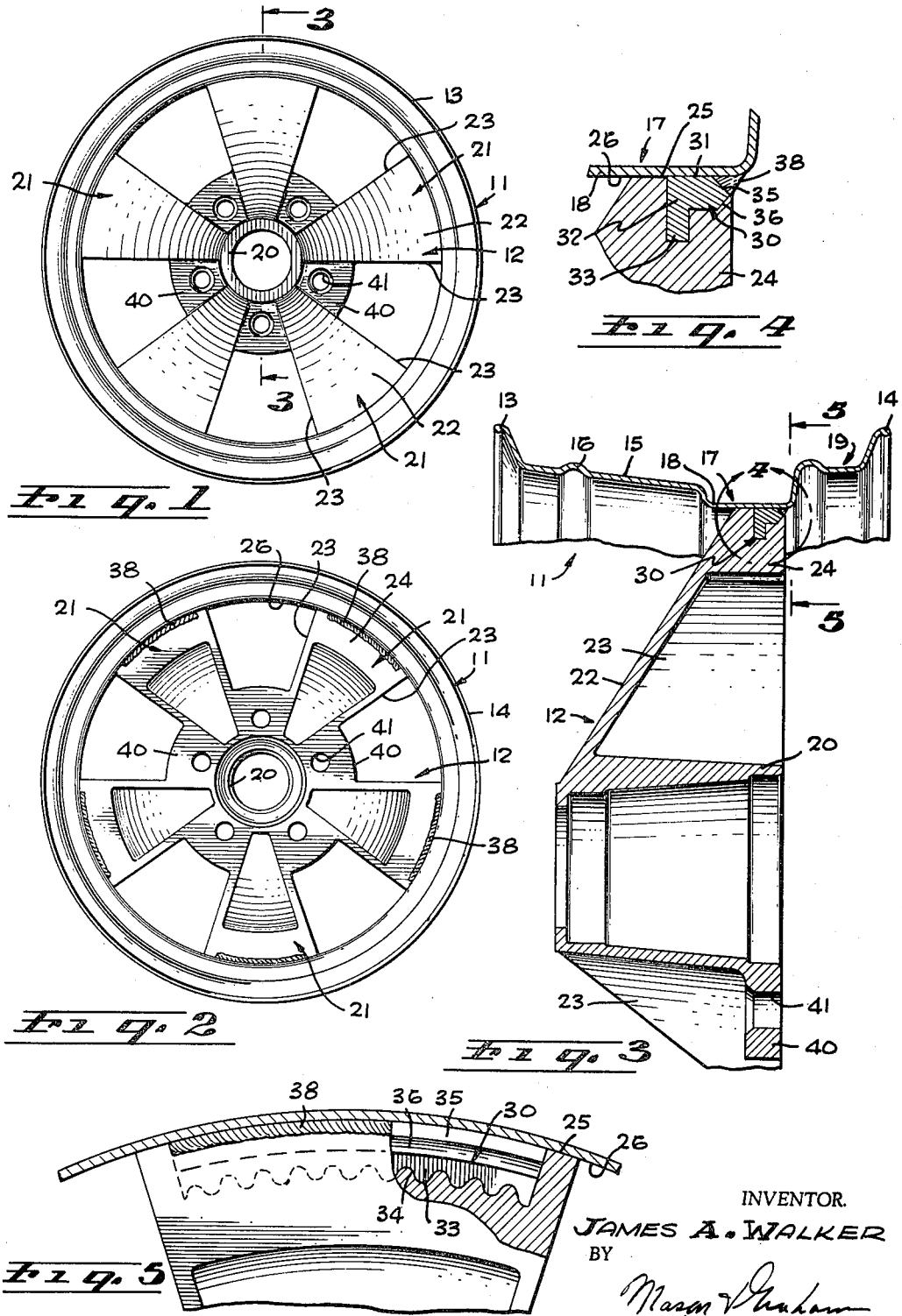

3,250,572
NONFERROUS WHEEL HAVING STEEL INSERTS AND STEEL RIM WELDED THERETO
James A. Walker, Compton, Calif., assignor to Bell Auto Parts, Inc., Bell, Calif., a corporation of California
Filed Mar. 23, 1964, Ser. No. 353,824
2 Claims. (Cl. 301—65)

This invention has to do with automobile wheels and particularly with special wheels which combine strength and beauty and which are designed for use on high performance cars where the wheels are subjected to severe stresses.

An object of the invention is to provide a new and improved relatively lightweight automobile wheel of attractive appearance and exceptional strength. In this connection it is an object to provide a wheel which is capable of withstanding extremely high side loading without damage.

Another object of the invention is to provide an automobile wheel having an inner body comprising a hub and spokes made of a high-strength, nonferrous metal alloy, and a steel rim, with the inner body and rim joined by novel means. I am aware that wheels have heretofore been made wherein the hub and spokes or inner body of the wheel and the rim are of dissimilar materials, but difficulty has been experienced in joining the parts in a manner to secure the strength desired. Therefore, it is an object to overcome this by providing a novel wheel construction utilizing ferrous metal inserts in the inner body and welds integrally joining these with the rim.

A further object is to provide novel metal inserts for the purpose described and a novel method of mounting these in the inner body of a wheel or the like.

Another object is to provide a novel construction of a wheel of the type indicated wherein the inner body comprising the hub and spokes is joined to the rim adjacent the inner or rear edge thereof to expose a large area of the inner surface of the rim to view when the wheel is mounted.

These and other objects will be apparent from the drawing and the following description. Referring to the drawing:

FIG. 1 is an elevational view showing the outer or front side of a wheel embodying the invention;

FIG. 2 is an elevational view of the inner or rear side of the wheel of FIG. 1;

FIG. 3 is a fragmentary cross sectional view on line 3—3 of FIG. 1, but on a larger scale;

FIG. 4 is an enlarged fragmentary detail sectional view of the region indicated by the line 4 of FIG. 3; and FIG. 5 is a fragmentary sectional view on line 5—5 of FIG. 3, but on a larger scale.

More particularly describing the invention, the wheel comprises in general a rim 11 and an inner body 12. The rim may be of standard steel construction and of suitable cross sectional configuration. Preferably the rim is chromium plated for appearance. The particular rim shown has two lateral flanges 13 and 14, a relatively long frusto-conical section 15 which is interrupted by an annular, laterally rounded rib 16, a channel 17 with a bottom wall 18 which is preferably cylindrical, and an inner channel area 19 adjacent flange 14.

The inner body 12 of the wheel is preferably formed as a casting of nonferrous metal, such as a high strength aluminum alloy, and comprises generally a central hub 20 and a plurality of radial spokes or spoke sections 21. Each spoke is formed by a generally rearwardly inclined outer wall 22, a pair of side walls 23 and a relatively thick peripheral wall 24. The latter has an arcuate end surface 25 which is curved on substantially the same radius as the inner surface 26 of the channel portion 17 of the rim.

Since the inner body 12 is made of a nonferrous metal, in order to integrally join this body to the rim, I provide a ferrous metal insert 30 in each spoke at the edge portion thereof in the wall 24. This insert may be of cast steel and is firmly embedded in the wall 24 by casting the nonferrous metal of the inner body 12 about the inserts. Due to the differences in the coefficient of expansion of the metals, the inserts are firmly gripped by the nonferrous metal.

Each insert 30 is generally arcuate and has an exposed surface 31 that is flush or coincident with the outer edge surface 25 of the spoke. The insert includes a main body 32 and an inwardly extending flange 33 which is preferably provided with a scalloped edge 34. The main body of the insert is shaped to provide two converging beveled or conoidal surfaces 35 and 36. The first surface 35 cooperates with the rim to provide a fillet or space to receive weld metal material 38.

In joining the parts, the inner body is placed within the rim in the position in which it is shown in the drawings. Preferably the dimensions of the parts are such that the inner body is a press fit within the rim. With the parts in proper position the inserts are joined integrally to the rim by welding to produce the welds 38.

In order that the wheel can be readily mounted on an automobile, webs 40 are provided between the spokes adjacent the hub and these are apertured at 41 to receive the conventional wheel-mounting bolts.

Tests have proven the wheel construction to be extremely strong and able to withstand side loads many times the standards required by the automobile industry. The scalloped, convolute, or interrupted inner edges of the inserts reduce or minimize localization of shear stresses under loading. Also, the wheel is advantageously effective for dissipating heat from the brake drums.

Although I have shown and described preferred forms of my invention, I contemplate that various changes and modifications can be made therein without departing from the invention, the scope of which is indicated by the following claims:

I claim:

1. An automobile wheel, comprising a steel rim presenting a circular axially extending inner surface area, an inner body of nonferrous metal formed to provide a tubular hub and a plurality of spokes extending radially therefrom, and apertured wheel-mounting webs adjacent the hub and between the spokes, said spokes terminating in arcuate ends positioned against said inner surface area of said rim, inserts of ferrous metal embedded in the ends of said spokes having arcuate outer surfaces exposed to and against said inner surface area of the rim, the ends of said spokes adjacent said inserts terminating short of said rim on one side to provide a space at each spoke for welding, and welds in said spaces joining said inserts to said rim.

2. A vehicle wheel assembly, including: a hub made of nonferrous metal and having a plurality of circumferentially spaced rim mounting portions each having an axially extending circumferentially arcuate outer end surface, a steel rim having a circular axially extending inner surface placed over and engaging said end surfaces; steel inserts carried by said mounting portions to afford the welding thereof to said rim, each of said inserts including a body portion embedded in one of said mounting portions and an end portion terminating at the inner surface of said rim, at least the juncture of said end portions and said inner surface of said rim being exposed at one side of said wheel, and a bead of weld applied to said exposed juncture and joining said rim to said hub.

References Cited by the Examiner

UNITED STATES PATENTS

| | | | |
|---|---|---|---|
| 2,008,933 | 7/1935 | Sinclair | 301—65 |
| 2,164,883 | 7/1939 | Moore | 301—6 |
| 2,406,062 | 8/1946 | Cornell | 29—159.01 |
| 2,439,881 | 4/1948 | Ash | 301—65 |
| 2,631,897 | 3/1953 | Ewart | 301—65 |
| 2,653,547 | 9/1953 | Langdon | 29—470.7 X |
| 3,044,154 | 7/1962 | Moyer | 29—159.01 |
| 3,154,347 | 10/1964 | Griffith | 301—5 |

FOREIGN PATENTS

| | | |
|---|---|---|
| 387,086 | 2/1933 | Great Britain. |
| 463,319 | 3/1937 | Great Britain. |

OTHER REFERENCES

Johnson: Magnasteel Wheels, advertising brochure published by Johnson's Engineering, Portland, Oregon, distributed nationally in March 1963.

BENJAMIN HERSH, *Primary Examiner.*

ARTHUR L. LA POINT, *Examiner.*

B. J. JOHNSON, *Assistant Examiner.*